United States Patent
Morinaga

(10) Patent No.: US 6,708,724 B2
(45) Date of Patent: Mar. 23, 2004

(54) FUEL FEED APPARATUS

(75) Inventor: Mikio Morinaga, Mie (JP)

(73) Assignee: Bestex Kyoei Co., Ltd., Mie (JP)

( * ) Notice: Subject to any disclaimer, the term of this patent is extended or adjusted under 35 U.S.C. 154(b) by 21 days.

(21) Appl. No.: 09/995,510

(22) Filed: Nov. 27, 2001

(65) Prior Publication Data

US 2002/0189691 A1 Dec. 19, 2002

(30) Foreign Application Priority Data

Jun. 19, 2001 (JP) ........................................ 2001-184349

(51) Int. Cl.⁷ ................................................ F02M 33/02
(52) U.S. Cl. ........................ 137/588; 141/59; 141/302; 220/86.2
(58) Field of Search ................................ 137/588, 587; 141/59, 302; 220/86.2

(56) References Cited

U.S. PATENT DOCUMENTS 4,715,509 A * 12/1987 Ito et al. ..................... 220/86.2
4,955,950 A * 9/1990 Seiichi et al. ............... 220/86.2
6,105,612 A * 8/2000 Schaar ........................ 137/588

FOREIGN PATENT DOCUMENTS

DE 19911489 A1 * 10/1999
JP 07-189841 7/1995

* cited by examiner

*Primary Examiner*—John Rivell
(74) *Attorney, Agent, or Firm*—Merchant & Gould P.C.

(57) ABSTRACT

A fuel feed pipe 1 having a branch pipe 6 for releasing evaporated fuel to a canister is provided, wherein the fuel feed pipe 1 is provided with a branch pipe blocking mechanism 8 for blocking an opening of the branch pipe 6 by being mechanically linked with the motion of inserting a fuel feed gun G. The branch pipe blocking mechanism 8 consists of a leaf spring 9 made of stainless steel and a rubber seal 10. A base end section of the leaf spring 9 is secured to a fuel feed guide 3 and a top side of the leaf spring 9 is provided with the rubber seal 10. When a shutter valve 4 is rotated by the insertion of the fuel feed gun G, the leaf spring 9 is elastically deformed by being mechanically linked with the rotation of the shutter valve 4 to allow the rubber seal 10 to close the opening of the branch pipe 6.

1 Claim, 5 Drawing Sheets

FUEL FEED APPARATUS

BACKGROUND OF THE INVENTION

1. Field of the Invention

The present invention relates to a fuel feed pipe for feeding fuel to a fuel tank of a motor vehicle or the like, and more particularly to a fuel feed pipe provided with a branch pipe for releasing evaporated fuel to a canister.

2. Description of the Prior Art

FIG. 5 is a view showing the structure of a conventional fuel feed pipe and evaporated fuel treating device which are shown in FIG. 2 of the official gazette of Japanese Unexamined Patent Publication No. HEI 7-189841. An upper section of a fuel tube 52 (i.e. a fuel feed pipe) of a fuel tank 51 is provided with an elastic seal member 55 (e.g. a seal member made of rubber) for closely contacting a peripheral section of a fuel feed gun (not shown) to prevent evaporated fuel from leaking from a fuel feed port during a fuel feed operation and a shutter valve 54 provided downstream of the elastic seal member 55 which is opened when the fuel feed gun is inserted in the fuel feed port. An evaporated fuel intake tube 53 for communicating with the upper section of the fuel tank 51 opens downstream of the shutter valve 54 of the fuel tube 52.

A charging passage 56 for communicating with a canister 59 through a two-way valve 58 opens downstream of the shutter valve 54 of the fuel tube 52. The two-way valve 58 opens whether fuel is being fed or not when the pressure of the fuel tank 51 is higher by a first predetermined pressure {e.g. 7.3 kilo pascal (55 mmHg)} or higher than atmospheric pressure. The two-way valve 58 also opens when the pressure of the fuel tank 51 is lower by a second predetermined pressure {e.g. 2.7 kilo pascal (20 mmHG)} or higher than the pressure in the canister 59.

Accordingly, as the conventional fuel feed pipe and evaporated fuel-treating device shown in FIG. 5 keep the pressure of the fuel tank 51 high whether fuel is being fed or not, it is possible to control the generation of evaporated fuel and to reduce the capacity of the canister 59.

In the conventional fuel feed pipe and evaporated fuel-treating device shown in FIG. 5, the fuel sometimes rises up to the vicinity of the upper end of the fuel tube 52 during the fuel feed operation so as to enter the charging passage 56 side. This is not desirable.

SUMMARY OF THE INVENTION

It is therefore an object of the present invention to solve such a problem as stated above and to provide a fuel feed pipe which can prevent fuel from flowing into a branch pipe side of a charging passage or the like even in the case where the fuel rises up to the vicinity of the upper end of a fuel tube during a fuel feed operation.

To solve the above-mentioned problem, according to the present invention, a fuel feed pipe having a branch pipe for releasing evaporated fuel to a canister is provided, wherein the fuel feed pipe is provided with a branch pipe blocking mechanism for blocking an opening of the branch pipe by being mechanically linked with the motion of inserting a fuel feed gun.

In the fuel feed pipe according to the present invention, in a fuel feeding condition in which the fuel feed gun is inserted into a fuel feed port of the fuel feed pipe, the opening of the branch pipe for releasing evaporated fuel to a canister is blocked by the branch pipe blocking mechanism for blocking the opening of the branch pipe by linking with the insertion of the fuel feed gun. Accordingly, the fuel is prevented from flowing into the branch pipe during a fuel feed operation.

BRIEF DESCRIPTION OF THE DRAWINGS

The above and other objects, features and advantages of the present invention will become more apparent from the following description when taken in conjunction with the accompanying drawings.

DETAILED DESCRIPTION OF THE PREFERRED EMBODIMENTS

Figure 1:
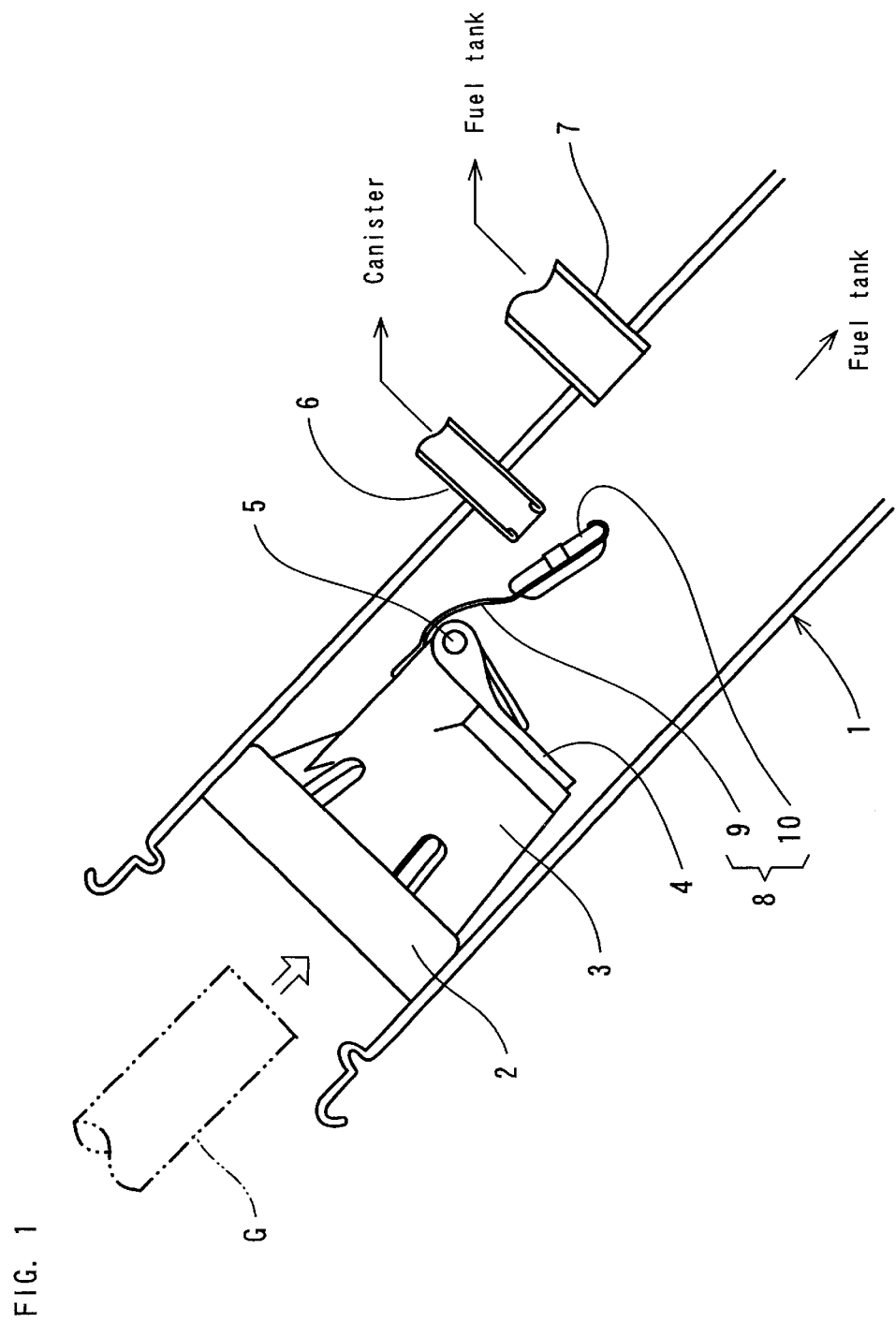
FIG. 1 is a view showing the structure of an important section of a fuel feed pipe according to the present invention.
Figure 2:
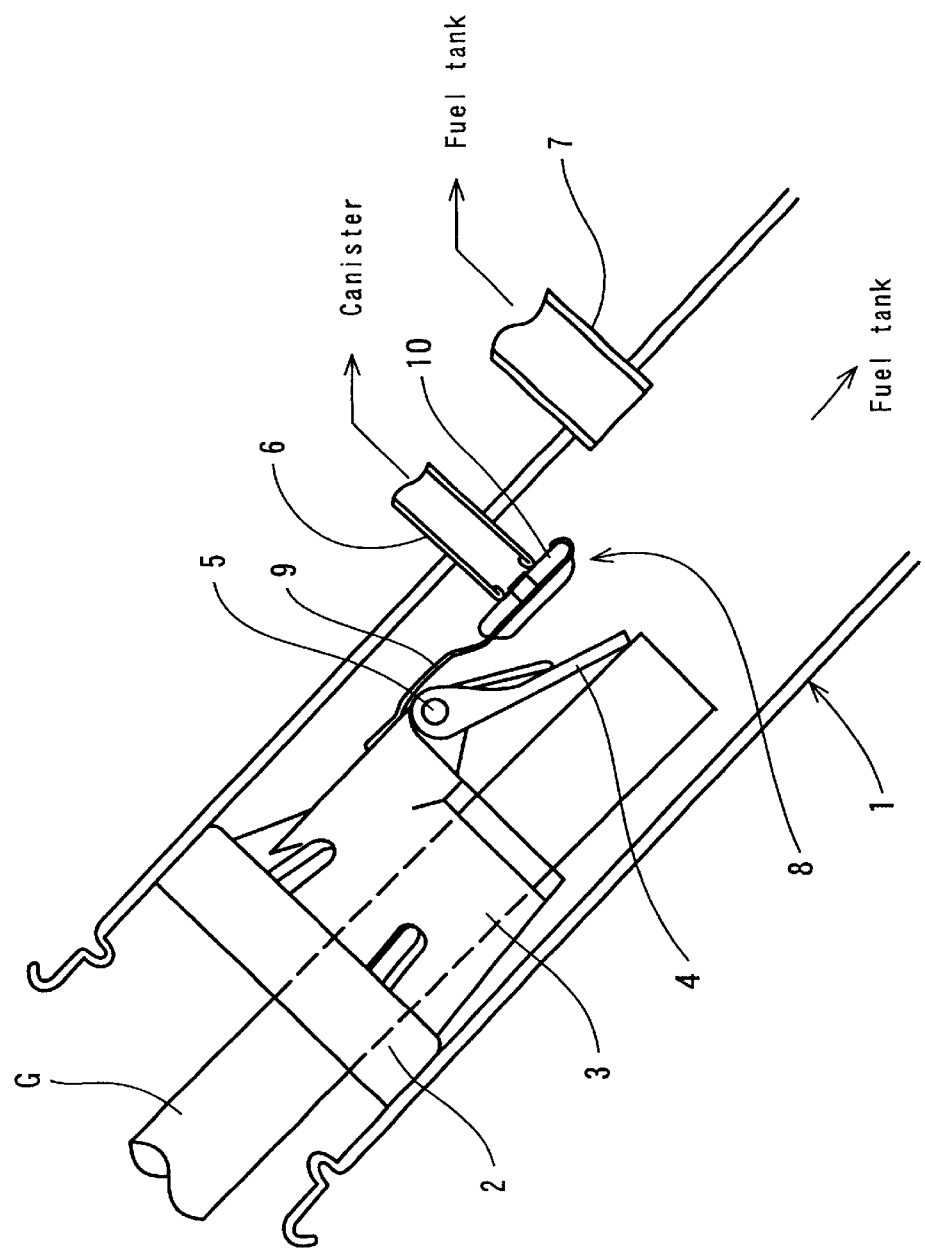
FIG. 2 is a fuel feeding condition of the fuel feed pipe according to the present invention.
Figure 3:
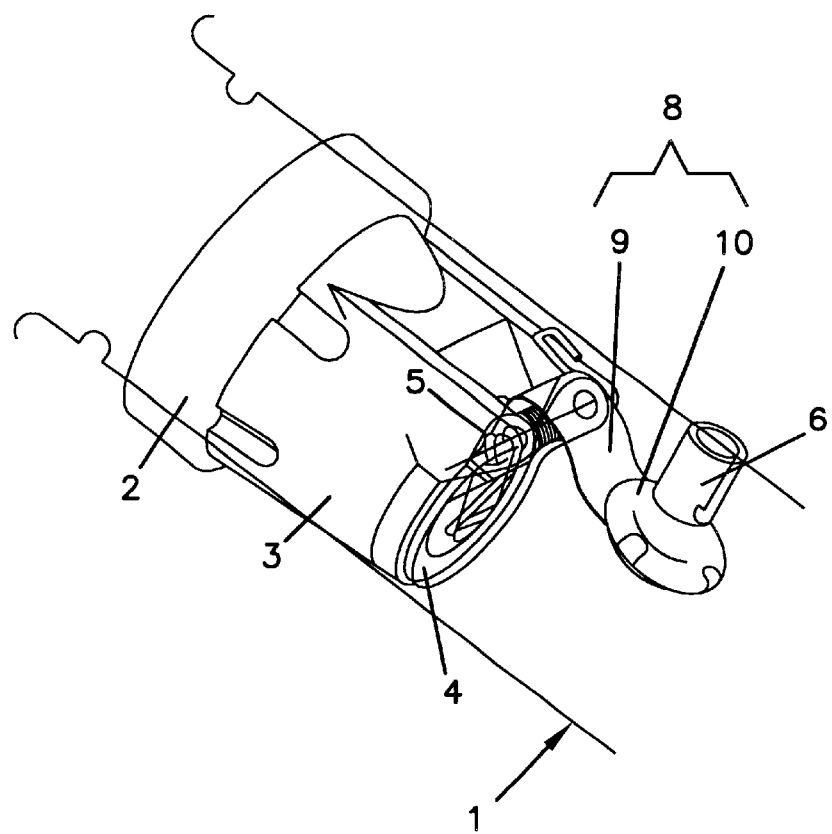
FIG. 3 is a perspective view of the important section of the fuel feed pipe according to the present invention.

Preferred embodiments of the present invention will now be described with reference to the accompanying drawings. FIG. 1 is a view showing a structure of an important section of a fuel feed pipe according to the present invention. FIG. 2 is a view showing a fuel feeding condition of the fuel feed pipe according to the present invention and FIG. 3 is a perspective view of the important section of the fuel feed pipe according to the present invention.

The upper end (i.e. a fuel feed port) side of the fuel feed pipe 1 is provided with a bracket 2 made of steel which holds a fuel feed guide 3 (i.e. a resin bracket) made of resin. The fuel feed guide 3 is provided with a shutter valve 4 (i.e. a fuel feed on-off valve) which is opened by the insertion of a fuel feed gun G. The shutter valve 4 is pivoted through an axis 5 to the fuel feed guide 3 for opening or closing movement. The shutter valve 4 is biased in a direction to close the fuel feed guide 3 by a torsion coil spring or the like (not shown).

Connected to a downstream side of the fuel feed guide 3 in the fuel feed pipe 1 are a branch pipe 6 for releasing evaporated fuel to a canister and a branch pipe 7 for communicating with the upper section of a fuel tank (not shown).

The fuel feed guide 3 is provided with a branch pipe blocking mechanism 8 for blocking an opening of the branch pipe 6 for releasing evaporated fuel to the canister by being mechanically linked with the insertion of the fuel feed gun. The branch pipe blocking mechanism 8 consists of a leaf spring 9 made of stainless steel and a rubber seal 10, and is constructed to close the opening of the branch pipe 6 by a rubber seal 10 by being mechanically linked with the rotation of the shutter valve 4 when the shutter valve 4 is rotated by the insertion of the fuel feed gun G (refer to FIG. 2).

The base end section of the leaf spring 9 is secured to the fuel feed guide 3 and the top side of the leaf spring 9 is provided with a rubber seal 10. In a condition in which fuel is not fed (i.e. in a condition in which the fuel feed gun is not inserted into the fuel feed port), as shown in FIG. 1, the rubber seal 10 is removed from the opening of the branch pipe 6. As shown in FIG. 2, when the shutter valve 4 is opened by the insertion of the fuel feed gun G, a cam surface (not shown) formed on the shutter valve 4 or a cam surface (not shown) formed on a pivot 5 contacts the base end section side of the leaf spring 9 to elastically deform the leaf spring 9. In this manner, the rubber seal 10 provided on the top side of the leaf spring 9 contacts the opening of the branch pipe 6. It is also possible to interpose a torsion coil spring between the shutter valve 4 and the leaf spring 9 to allow the rubber seal 10 to contact the opening of the branch pipe 6 in response to the opening of the shutter valve 4.

With this construction, as the fuel feed pipe 1 according to the present invention blocks the opening of the branch pipe 6 for releasing evaporated fuel to the canister side by the branch pipe blocking mechanism 8 when the fuel feed gun G is inserted into the fuel feed port for feeding fuel, the fuel is prevented from flowing into the branch pipe 6 side during the fuel feeding operation. Accordingly, it is possible to positively prevent the fuel from entering the canister.

Figure 4:
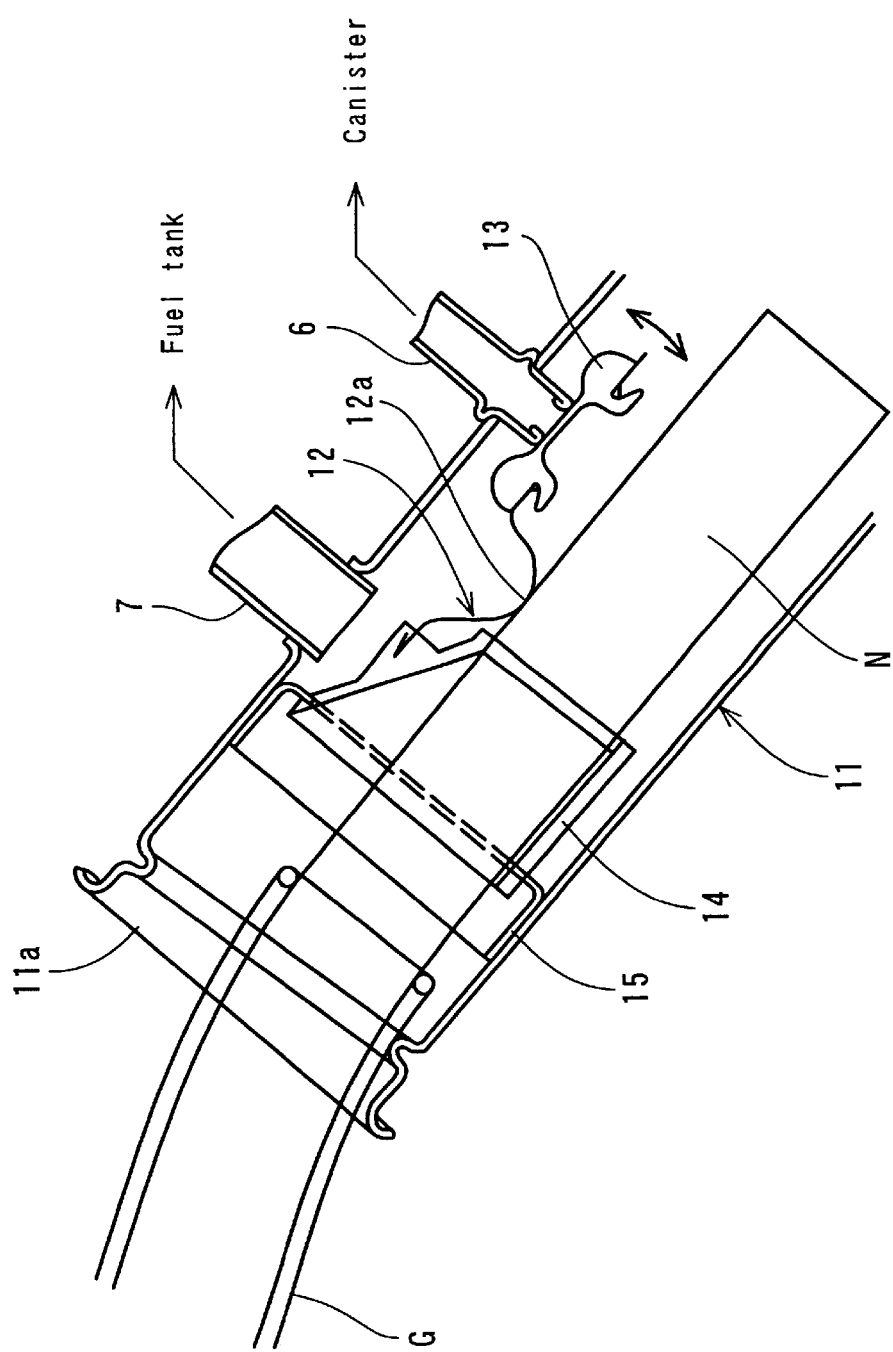
FIG. 4 is a view showing a structure of an important section of another fuel feed pipe according to the present invention.
Figure 5:
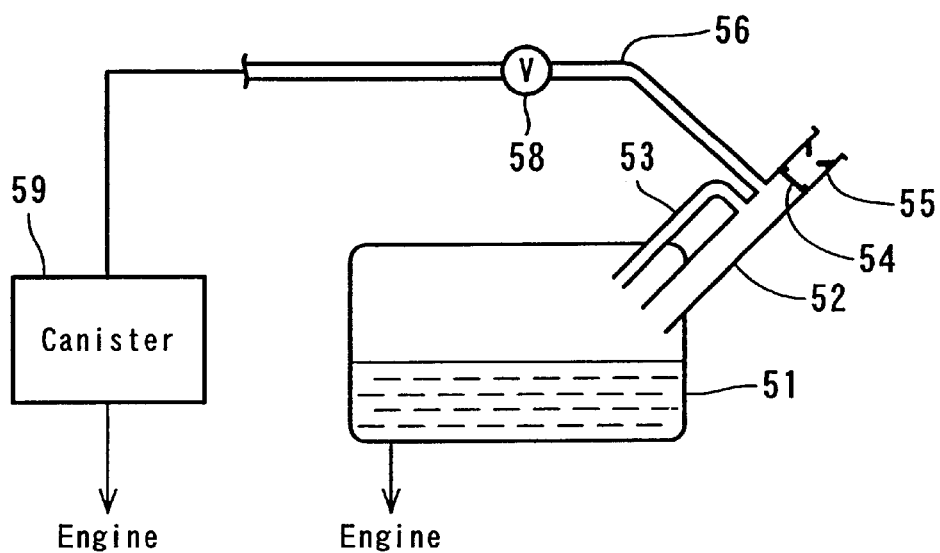
FIG. 5 is a view showing a structure of the conventional fuel feed pipe and evaporated fuel-treating device.

FIG. 4 is a view showing a structure of an important section of another fuel feed pipe according to the present invention. A fuel feed pipe 11 shown in FIG. 4 is constructed in such a manner that, in a condition in which a fuel feed gun G is inserted in a fuel feed port, a curved section 12a of a leaf spring 12 made of stainless steel contacts the outer periphery of a nozzle N of the fuel feed gun G, wherein a rubber seal 13 installed on the top side of the leaf spring 12 blocks an opening of the branch pipe 6 for releasing evaporated fuel to a canister A base end side of the leaf spring 12 is secured to a fuel feed guide 14. The fuel feed guide 14 is secured through a bracket 15 to the fuel feed pipe 11. In the condition in which the fuel feed gun G is not inserted, the rubber seal 13 keeps the branch pipe 6 open by the restoring force of the leaf spring 12.

Reference numeral 7 is another branch pipe for communicating with the upper section of a fuel tank (not shown). In FIG. 4, one example is shown in which the branch pipe 7 for communicating with the upper section of the fuel tank (not shown) is provided upstream (i.e. a side of a fuel feed port 11a) of the branch pipe 6 for releasing evaporated fuel to the canister. It is however possible to provide the branch pipe 7 for communicating with the upper section of the fuel tank (not shown) downstream of the branch pipe 6 for releasing evaporated fuel to the canister.

With this construction, as the branch pipe 11 according to the present invention blocks the opening of the branch pipe 6 for releasing evaporated fuel to the canister by a branch pipe blocking mechanism consisting of the leaf spring 12 and the rubber seal 13 when the fuel feed gun G is inserted for feeding fuel, the fuel is prevented from flowing into the branch pipe 6 side during the fuel feed operation. Accordingly, it is possible to positively prevent the fuel from entering the canister.

As described above, according to the present invention, when the fuel feed gun is inserted into the fuel feed pipe, the branch pipe for releasing evaporated fuel to the canister is blocked by the branch pipe blocking mechanism. It is therefore possible to prevent the fuel from flowing into the branch pipe side during the fuel feed operation and thus to prevent the fuel from entering the canister.

What is claimed is:

1. Fuel feed apparatus, comprising:
   a fuel feed pipe;
   a branch pipe connected to the fuel feed pipe for releasing evaporated fuel to a canister, said branch pipe having an opening;
   a fuel feed guide secured to the fuel feed pipe;
   a branch pipe blocking mechanism for blocking the opening of the branch pipe when a fuel feed gun is inserted through the fuel feed guide in the fuel feed pipe; and
   a leaf spring connecting the branch pipe blocking mechanism and the fuel feed guide.

* * * * *